United States Patent [19]

Anno et al.

[11] 4,221,775

[45] Sep. 9, 1980

[54] METHOD OF PRODUCING POROUS LITHIUM OXIDE

[75] Inventors: James N. Anno, Cincinnati; Howard H. Boeing, Cleves, both of Ohio

[73] Assignee: Research Dynamics, Inc., Cincinnati, Ohio

[21] Appl. No.: 973,085

[22] Filed: Dec. 26, 1978

[51] Int. Cl.$^2$ .............................................. C01D 1/02
[52] U.S. Cl. .................................................... 423/641
[58] Field of Search ............................ 423/641, 179.5

[56] References Cited

U.S. PATENT DOCUMENTS 3,321,277  5/1967  Bach ..................................... 423/641

FOREIGN PATENT DOCUMENTS 146730  9/1962  U.S.S.R. .................................... 423/641

Primary Examiner—Delbert E. Gantz
Assistant Examiner—Wayne A. Langel
Attorney, Agent, or Firm—Frost & Jacobs

[57] ABSTRACT

A method of producing porous lithium oxide having an average pore spacing not greater than about 20 microns and preferably not greater than about 10 microns, wherein lithium hydroxide is heated above the melting point of anhydrous lithium hydroxide in an inert atmosphere, cooled to a temperature below its melting point in the inert atmosphere, subjected to reduced pressure not exceeding 2 microns of mercury and heated to a temperature of about 150° to about 200° C. under reduced pressure, to obtain porous lithium oxide. Porous microspheres of lithium oxide can be obtained by passing the molten lithium hydroxide through a small bore vertical tube to form a liquid jet which is disintegrated into molten microspheres, cooled and heated under the conditions described above.

12 Claims, No Drawings

METHOD OF PRODUCING POROUS LITHIUM OXIDE

BRIEF SUMMARY OF THE INVENTION

This invention relates to a method for producing porous lithium oxide ($Li_2O$) from lithium hydroxide which has an average pore spacing not greater than about 20 microns.

Porous lithium oxide is useful as an absorbent for carbon dioxide and other acidic gases in atmospheric purification. Other commercial and research applications are known.

Another use for porous lithium oxide having great potential is in thermonuclear fusion reactors. The most promising fusion reaction currently under consideration is one using deuterium and tritium fuel:

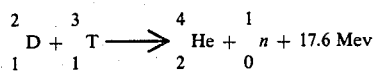

Deuterium can be obtained in almost unlimited quantities from ocean waters. On the other hand, tritium is not readily available. One suggested source is to use the neutron from the above deuterium-tritium reaction and react it with the lithium 6 isotope to breed tritium on a one-to-one basis by the following reaction:

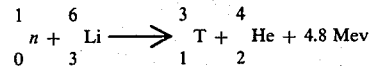

A desirable (n, n') reaction with the more abundant lithium 7 isotope also occurs which enhances the fusion reaction and produces tritium. This concept involves surrounding the fusion reactor chamber with a blanket of lithium-containing material which will absorb the neutrons to breed tritium. However, there is a problem with respect to the optimum form of lithium-containing material in the blanket. The use of liquid lithium metal as a blanket has been suggested because of its excellent heat transfer properties, but separation of the tritium bred in the lithium from the liquid metal is apparently a very difficult if not an insurmountable problem. As an alternative, it has been proposed to use very small porous lithium oxide microspheres (about 100 microns diameter) as an integral part of a microsphere-gas heat transfer medium which is blown around the fusion reaction chamber. If the lithium oxide is sufficiently porous, i.e. an average interpore spacing of less than about 10 microns, the tritium can readily be driven out of the porous material by heating it.

Lithium oxide can be prepared in a number of ways. For example, pyrolysis or thermal decomposition of lithium hydroxide, lithium carbonate or lithium peroxide ($Li_2O_2$) will yield lithium oxide. Direct combination of the elements lithium and oxygen will of course yield lithium oxide. Lithium oxide can also be produced indirectly by reaction in liquid ammonia with oxygen supplied to the reaction mixture to yield lithium oxide.

The known reactions described generally above, do not yield a product having high porosity. For example, applicants conducted an experiment following the conventional pyrolysis technique which involved heating lithium peroxide powder in a helium atmosphere at a rate of 100° C. per hour to a temperature of 470° C., at which temperature the powder melted and formed a solid almost immediately. The temperature was increased to 495° C. and held for 40 minutes, followed by cooling to room temperature and sealing in a helium filled bag. Photomicrographs were then taken which indicated an average interpore spacing of about 490 microns.

To the best of applicants' knowledge, no process has yet been suggested which would produce lithium oxide having an average interpore spacing of less than about 20 microns for use as a greatly improved carbon dioxide absorbent, much less a process for producing lithium oxide having an average interpore spacing of less than 10 microns for use as a source of tritium in a fusion reactor.

U.S. Pat. No. 3,321,277, issued to R. O. Bach, discloses a method of producing lithium oxide having active absorption capacity, comprising the steps of preparing lithium peroxide granules having a connected porous structure, and thermally decomposing the lithium peroxide to lithium oxide under conditions maintaining the connected porous structure by heating slowly at 225° to 450° C. in an inert atmosphere. Preferably the heating is conducted under a vacuum of 1 to 5 mm of mercury for periods of time up to about 24 hours at a temperature up to about 390° C. The porosity of the lithium oxide product so obtained is defined in this patent (column 3, lines 7–9) as "a molar-volume ratio of 15/20 or 0.75, which ratio indicates a 25% connected void in the oxide."

The present applicants have calculated this as being an average interpore spacing of about 40 to 50 microns.

U.S. Pat. No. 2,424,512, issued to R. A. Stauffer, discloses a process for recovery of lithium oxide from silicate and phosphate ores thereof wherein the powdered ore is mixed with lime and pelletized, heated under reduced pressure below 1 mm of mercury to a temperature above 900° C., causing the lime to displace the lithium oxide. The oxide is distilled off and condensed.

*Inorganic Synthesis*, by A. J. Cohen, Vol. 5, Chapter 1A, pp. 3–4, McGraw-Hill, New York, (1957) reports a process for production of lithium oxide by heating anhydrous lithium hydroxide to 675°±10° C. under a vacuum of about 0.5 inch of mercury for one half hour.

Neither the Stauffer nor the Cohen book contains any disclosure regarding the porosity of lithium oxide produced in accordance with the processes disclosed therein.

It is therefore apparent that the prior art has not suggested any method regardless of starting material by which lithium oxide having a high degree of porosity, i.e. an average interpore spacing not greater than about 20 microns, can be obtained.

It is a principal object of the present invention to provide a method for producing lithium oxide from lithium hydroxide having an average pore spacing not greater than about 20 microns.

It is a further object of the invention to produce porous microspheres of lithium oxide from lithium hydroxide having an average pore spacing not greater than about 10 microns.

DETAILED DESCRIPTION

According to the present invention there is provided a method of producing porous lithium oxide, comprising the steps of heating lithium hydroxide above the melting point of anhydrous lithium hydroxide in an atmosphere inert thereto, cooling the molten lithium hydroxide to a temperature below its melting point in the inert atmosphere, subjecting the cooled lithium hydroxide to reduced pressure, not exceeding about 2 microns of mercury, and heating the lithium hydroxide to a temperature of about 150° C. to about 200° C. under such reduced pressure, thereby obtaining lithium oxide having an average pore spacing not greater than about 20 microns.

The method according to the invention of producing porous microspheres of lithium oxide comprises the steps of heating lithium hydroxide to a temperature above the melting point of anhydrous lithium hydroxide in an atmosphere inert thereto, passing the molten lithium hydroxide through a small bore substantially vertical tube to form a liquid jet, causing the jet to disintegrate into molten microspheres of lithium hydroxide, cooling the microspheres of lithium hydroxide, while falling in the inert atmosphere, to a temperature below the melting point of lithium hydroxide, subjecting the cooled microspheres to reduced pressure not exceeding about 2 microns of mercury, and heating the microspheres to a temperature of 150° to about 200° C. under such reduced pressure, thereby obtaining lithium oxide microspheres having an average pore spacing not greater than about 10 microns.

The product of the present invention does not exhibit a substantially connected porous structure.

The starting material of the method of the present invention may be lithium hydroxide monohydrate (LiOH.H$_2$O), which is the conventional form in which the hydroxide is commercially available. According to the literature the anhydrous form will readily absorb water and convert to the hydrated form, which exists as monoclinic crystals. Upon heating the single molecule of water of crystallization is driven off to produce the anhydrous form (tetragonal powder) which has a melting point of 450° or 462° C., according to various literature sources.

Although not wishing to be bound by theory it is believed that the first heating step of the present method, conducted in an atmosphere inert to lithium hydroxide, converts any hydrated hydroxide to the anhydrous form.

Continued heating of the lithium hydroxide (after conversion to the anhydrous form) above its melting point, when carried out in an atmosphere inert thereto such as helium, neon, argon or krypton, causes the hydroxide to melt while suppressing conversion thereof to lithium oxide. Since anhydrous lithium hydroxide decomposes at its boiling point, the preferred maximum heating temperature is about 480° C. As soon as all the hydroxide is molten, heating may be discontinued. The heating rate should be slow enough to drive off the water of crystallization before reaching the melting point. This rate may be from about 100° to about 200° C. per hour.

The molten anhydrous lithium hydroxide is cooled to a temperature below its melting point while protected by the inert atmosphere. The cooling rate appears to be immaterial. Preferably the hydroxide is cooled to room temperature in order that it may be transferred to a vacuum apparatus with precautions to avoid undue exposure to air. However, it is within the scope of the invention to conduct the initial heating step in an apparatus which can be connected to a vacuum source after the molten lithium hydroxide has cooled to a temperature below 150° C.

The cooled lithium hydroxide is then subjected to reduced pressure not exceeding about 2 microns of mercury, preferably not exceeding about 1 micron of mercury, and more preferably less than 1 micron. It is then heated while maintaining the vacuum to a temperature of about 150° to about 200° C., and held at that temperature until complete conversion to the oxide occurs. In the case of microspheres or small samples of solid material up to about 2 grams, the holding time need not exceed one half hour. Larger solid samples may require substantially longer time at temperature. The heating rate should be slow enough to avoid saturating the vacuum system, i.e., about 100° to about 150° C. per hour. Contrary to the disclosure of the above mentioned *Inorganic Synthesis* book by A. J. Cohen that anhydrous lithium hydroxide should be heated to about 675° C. in a vacuum of about 0.5 inch of mercury for one half hour in order to convert it to lithium oxide, applicants have discovered that anhydrous lithium hydroxide is converted to the oxide within the temperature range of about 150° to about 200° C., if the heating is conducted under reduced pressure not exceeding about 2 microns of mercury. This temperature range is of course far below the melting point of anhydrous lithium hydroxide at atmospheric pressure. Of greater significance is the fact that heating under such reduced pressure conditions results in a high degree of porosity, the average pore spacing being not greater than about 20 microns.

It is preferred to use as a starting material lithium hydroxide having a purity of at least about 97%, which is available commercially. It has been found that when the method of the present invention is carried out with such starting material, the purity is preserved and even slightly enhanced, with the final product having a purity of about 98% lithium oxide, and balance substantially lithium hydroxide. More volatile impurities present in the starting material are driven off during the heating steps. In the preferred practice the material may be heated to a relatively high temperature, on the order of about 700° C., after conversion of the hydroxide to the oxide, in order to obtain an even higher purity and optimum interpore spacing. The heating rate for this optional step may be relatively rapid, and the holding time at peak temperature need be only a few minutes.

By way of an exemplary but non-limiting embodiment a silver crucible was filled with as received lithium hydroxide monohydrate crystals, placed in a retort which was supplied with an argon atmosphere and heated to 470° C. at a heating rate of about 150° C. per hour. After reaching 470° C., the material was held at this temperature until a completely clear melt was obtained. The molten lithium hydroxide was then permitted to cool to room temperature. The cooling rate was not controlled. It was noted that a solid slug of material remained in the crucible.

The silver crucible containing the anhydrous lithium hydroxide was then placed in a vacuum chamber, which was evacuated to a pressure of about 1 micron, and the crucible was heated to about 180° C. at a rate of about 100° C. per hour. The material was then heated at a rate of about 200° C. per hour to about 700° C., held for 5 minutes at that temperature, and cooled to room temperature while maintained under reduced pressure. It was then removed to be photomicrographed.

A photomicrograph of the porous lithium oxide indicated that the average pore spacing was about 5 microns. The purity was 98.1%.

In order to produce porous microspheres of lithium oxide, the above method is modified by feeding molten lithium hydroxide (after heating above the melting point of anhydrous lithium hydroxide) through a small bore vertical tube to form a liquid jet. The bore of such a tube may be on the order of 0.1 mm, i.e., the desired diameter of the microspheres. The liquid jet is then caused to disintegrate to form microspheres of molten lithium hydroxide by techniques disclosed in *The Mechanics of Liquid Jets,* by J. N. Anno, Lexington Books, D. C. Heath and Co., Lexington, Mass. (1977), the disclosure of which is incorporated herein by reference. As the microspheres of molten lithium hydroxide fall in an inert atmosphere such as argon, they are cooled to solid microspheres of anhydrous lithium hydroxide. These microspheres are then collected and placed in a vacuum chamber, subjected to reduced pressure not exceeding about 2 microns of mercury, preferably about 1 micron, and heated as described previously to a temperature of about 150° to about 200° C., to produce porous lithium oxide microspheres of about 100 microns in diameter having an average pore spacing not greater than about 10 microns and preferably about 5 microns.

Modifications may be made without departing from the spirit and scope of the present invention. Thus, while a batch-type manner of production has been described above by way of specific example, continuous production is contemplated in appropriate apparatus providing a sealed chamber for heating in an inert atmosphere followed by evacuation for heating under reduced pressure. Accordingly, no limitations are to be inferred except as set forth in the appended claims.

What we claim is:

1. A method of producing porous lithium oxide, comprising the steps of heating lithium hydroxide above the melting point of anhydrous lithium hydroxide in an atmosphere inert thereto, cooling the molten lithium hydroxide to a temperature below its melting point in said atmosphere, subjecting the cooled lithium hydroxide to reduced pressure not exceeding about 2 microns of mercury, and heating said lithium hydroxide to a temperature of about 150° C. to about 200° C. under said reduced pressure, thereby obtaining lithium oxide having an average pore spacing not greater than about 20 microns.

2. The method claimed in claim 1, wherein said molten lithium hydroxide is cooled to room temperature, and wherein said cooled lithium hydroxide is transferred to a vacuum environment not exceeding about 1 micron of mercury.

3. The method claimed in claim 1 or 2, wherein said lithium hydroxide is heated above its melting point in an inert gas chosen from the group consisting of helium, neon, argon and krypton.

4. The method claimed in claim 1 wherein said lithium hydroxide is heated in said inert atmosphere to a temperature above 450° C. but below its decomposition temperature.

5. The method claimed in claim 1, wherein the starting material is lithium hydroxide monohydrate.

6. The method claimed in claim 1, including the further step of heating under said reduced pressure to a temperature of about 700° C., after said step of heating to about 150° to about 200° C.

7. A method of producing porous microspheres of lithium oxide, comprising the steps of heating lithium hydroxide to a temperature above the melting point of anhydrous lithium hydroxide in an atmosphere inert thereto, passing the molten lithium hydroxide through a small bore substantially vertical tube to form a liquid jet, causing said jet to disintegrate into molten microspheres of lithium hydroxide, cooling said microspheres of lithium hydroxide, while falling in said inert atmosphere, to a temperature below the melting point of anhydrous lithium hydroxide, subjecting the cooled microspheres to reduced pressure not exceeding about 2 microns of mercury, and heating said microspheres to a temperature of about 150° to about 200° C. under said reduced pressure, thereby obtaining lithium oxide microspheres having an average pore spacing not greater than about 10 microns.

8. The method claimed in claim 6, wherein said microspheres are cooled to room temperature and transferred to a vacuum environment not exceeding about 1 micron of mercury.

9. The method claimed in claim 7 or 8, wherein said atmosphere is an inert gas chosen from the group consisting of helium, neon, argon and kryton.

10. The method claimed in claim 7, wherein said lithium hydroxide is heated in said inert atmosphere to a temperature above 450° C. but below its decomposition temperature.

11. The method claimed in claim 7, wherein the starting material is lithium hydroxide monohydrate.

12. Porous lithium oxide microspheres of about 100 microns in diameter having an average pore spacing not greater than about 10 microns.

* * * * *